(12) United States Patent
Hao et al.

(10) Patent No.: US 12,027,908 B2
(45) Date of Patent: Jul. 2, 2024

(54) HIGH POWER DENSITY UNIVERSAL VEHICLE CHARGER

(71) Applicant: GM GLOBAL TECHNOLOGY OPERATIONS LLC, Detroit, MI (US)

(72) Inventors: Lei Hao, Troy, MI (US); Suresh Gopalakrishnan, Troy, MI (US); Chandra S. Namuduri, Troy, MI (US); Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 17/746,139

(22) Filed: May 17, 2022

(65) Prior Publication Data

US 2023/0378797 A1    Nov. 23, 2023

(51) Int. Cl.
  *H02J 7/02*     (2016.01)
  *B60R 16/033*   (2006.01)
  *H02M 7/217*    (2006.01)
  *H02M 7/5387*   (2007.01)

(52) U.S. Cl.
  CPC ........... *H02J 7/02* (2013.01); *B60R 16/033* (2013.01); *H02M 7/217* (2013.01); *H02M 7/53871* (2013.01); *H02J 2207/20* (2020.01)

(58) Field of Classification Search
  CPC ....... H02J 7/02; H02J 2207/20; B60R 16/033; H02M 7/217; H02M 7/53871
  USPC .................................................. 307/9.1, 10.1
  See application file for complete search history.

(56) References Cited

U.S. PATENT DOCUMENTS

| | | | | |
|---|---|---|---|---|
| 4,942,353 A | * | 7/1990 | Herbert .................. | H01F 38/18 323/361 |
| 2012/0319542 A1 | * | 12/2012 | Hazeyama ............. | H02K 11/02 310/68 D |
| 2022/0355686 A1 | * | 11/2022 | Teng ...................... | B60L 53/11 |

* cited by examiner

*Primary Examiner* — Daniel Kessie
*Assistant Examiner* — Terrence R Willoughby
(74) *Attorney, Agent, or Firm* — CANTOR COLBURN LLP

(57) ABSTRACT

A system in a vehicle includes a first set of one or more windings and a second set of one or more windings electrically isolated from the first set of one or more windings. The system also includes a first inverter coupled to a battery of the vehicle and the first set of one or more windings and a second inverter electrically separated from the first inverter and coupled to the second set of one or more windings. A universal charger includes an alternative current (AC) charging port and a direct current (DC) charging port. A switch is controlled to close to connect the second inverter to the battery.

20 Claims, 3 Drawing Sheets

HIGH POWER DENSITY UNIVERSAL VEHICLE CHARGER

INTRODUCTION

The subject disclosure relates to a high power density universal vehicle charger.

Electric and hybrid vehicles (e.g., automobiles, trucks, construction equipment, automated factory equipment, farm equipment) are charged with external power sources (i.e., chargers). A charger may be an alternating current (AC) charger (e.g., level 1 or level 2 outlet connected to the electric power grid) or a direct current (DC) charger (e.g., DC fast charging (DCFC)). Additionally, the flow of current may be reversed to allow a vehicle to power the grid, for example, during a power outage. Each of these operations may require the vehicle to couple to a different system. Accordingly, it is desirable to provide a high power density universal vehicle charger.

SUMMARY

In one exemplary embodiment, system in a vehicle includes a first set of one or more windings and a second set of one or more windings electrically isolated from the first set of one or more windings. The system also includes a first inverter coupled to a battery of the vehicle and the first set of one or more windings and a second inverter electrically separated from the first inverter and coupled to the second set of one or more windings. A universal charger includes an alternative current (AC) charging port and a direct current (DC) charging port. A switch is controlled to close to connect the second inverter to the battery.

In addition to one or more of the features described herein, the switch is controlled to be open during charging of the battery via the AC charging port of the universal charger and the second inverter is not used.

In addition to one or more of the features described herein, the first set of one or more windings and the second set of one or more windings function as a transformer.

In addition to one or more of the features described herein, the first inverter functions as a synchronous active rectifier to convert AC from the AC charging port to DC needed by the battery and switches of the first inverter perform AC to DC conversion, power control, and power factor correction.

In addition to one or more of the features described herein, the switch is controlled to be closed during charging of the battery via the DC charging port of the universal charger based on a voltage of the DC charging port and the battery being a same voltage.

In addition to one or more of the features described herein, the switch is controlled to be open during charging of the battery via the DC charging port of the universal charger based on a voltage of the DC charging port and the battery being different voltages.

In addition to one or more of the features described herein, the first set of one or more windings and the second set of one or more windings function as a transformer.

In addition to one or more of the features described herein, the first inverter and the second inverter are used as a dual active bridge DC-DC converter.

In addition to one or more of the features described herein, the first inverter and the second inverter are integrated inverters such that a pair of switches of the first inverter and a pair of switches of the second inverter are fabricated as four submodules of a module that share a capacitor.

In addition to one or more of the features described herein, a current allocation among the submodules is based on a current rating of the first set of one or more windings and the second set of one or more windings.

In another exemplary embodiment, a method of assembling a system in a vehicle includes arranging a first set of one or more windings, arranging a second set of one or more windings to be electrically isolated from the first set of one or more windings, coupling a first inverter to a battery of the vehicle and the first set of one or more windings, and arranging a second inverter to be electrically separated from the first inverter and coupling the second inverter to the second set of one or more windings. The method also includes arranging a universal charger including an alternative current (AC) charging port and a direct current (DC) charging port and configuring a switch to be controlled to close to connect the second inverter to the battery.

In addition to one or more of the features described herein, the configuring the switch includes controlling the switch to be open during charging of the battery via the AC charging port of the universal charger such that the second inverter is not used.

In addition to one or more of the features described herein, the arranging the first set of one or more windings and the second set of one or more windings includes arranging the first set of one or more windings and the second set of one or more windings to function as a transformer.

In addition to one or more of the features described herein, the method also includes configuring the first inverter to function as a synchronous active rectifier to convert AC from the AC charging port to DC needed by the battery and configuring switches of the first inverter to perform AC to DC conversion, power control, and power factor correction.

In addition to one or more of the features described herein, the configuring the switch includes controlling the switch to be closed during charging of the battery via the DC charging port of the universal charger based on a voltage of the DC charging port and the battery being a same voltage.

In addition to one or more of the features described herein, the configuring the switch includes controlling the switch to be open during charging of the battery via the DC charging port of the universal charger based on a voltage of the DC charging port and the battery being different voltages.

In addition to one or more of the features described herein, the arranging the first set of one or more windings and the second set of one or more windings includes arranging the first set of one or more windings and the second set of one or more windings to function as a transformer.

In addition to one or more of the features described herein, the method also includes configuring the first inverter and the second inverter to function as a dual active bridge DC-DC converter.

In addition to one or more of the features described herein, the method also includes configuring the first inverter and the second inverter to be integrated inverters such that a pair of switches of the first inverter and a pair of switches of the second inverter are fabricated as four submodules of a module and coupling the first inverter and the second inverter to a shared capacitor.

In addition to one or more of the features described herein, the method also includes allocating current among the submodules based on a current rating of the first set of one or more windings and the second set of one or more windings.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
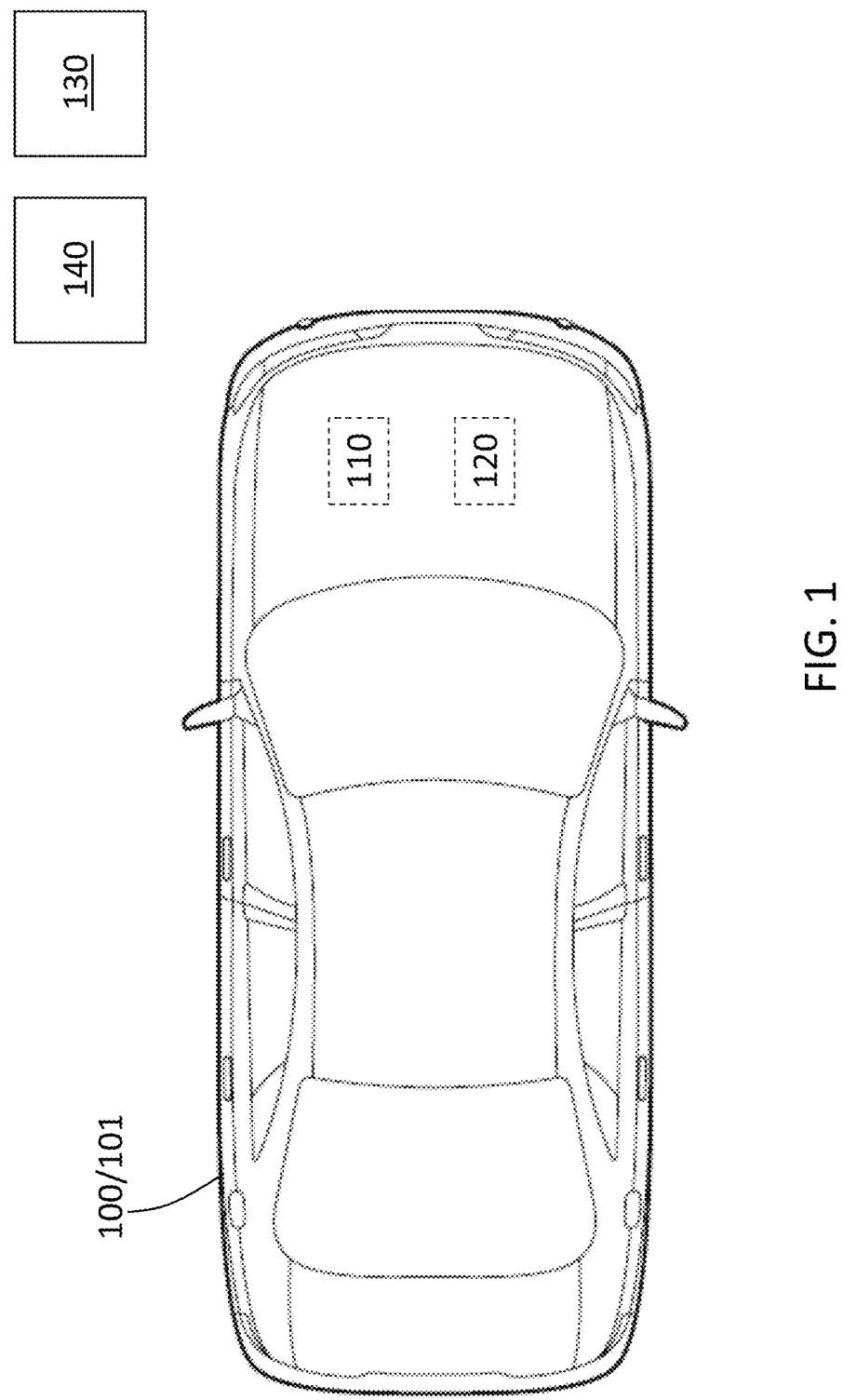
FIG. 1 shows a block diagram of a vehicle with a high power density universal charging system according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to a high power density universal vehicle charger. As previously noted, a battery of an EV may be charged via an AC or DC source. In addition, the battery of the EV may become the source of power to loads outside the vehicle as well as to those within. For example, the battery of the EV may supply power to the grid during a power outage. A prior approach involved a separate module, referred to as an onboard charging module for example, for AC charging versus DC charging via an EV charging system. The topology detailed herein facilitates selection of AC or DC charging and also facilitates reversing the direction of flow of current to allow the battery of the EV to become the power source. In addition, based on two winding groups associated with dual inverters, as detailed, the universal charger according to one or more embodiments facilitates high power density (e.g., >50 kilowatts (KW)).

In accordance with an exemplary embodiment, FIG. 1 shows a block diagram of a vehicle 100 with a high power density universal charging system 110. The exemplary vehicle 100 shown in FIG. 1 is an automobile 101. The vehicle 100 includes the high power density universal charging system 110, which is detailed with reference to FIG. 2. The vehicle 100 also includes a controller 120. The controller 120 may control aspects of the operation of the vehicle 100 and may also control aspects of the high density universal charging system 110, as detailed. An AC grid 130 and a universal charger 140 are shown outside the vehicle. The universal charger 140 may provide charging via either AC or DC. The universal charger 140 may be coupled to the AC grid 130 to obtain the power for AC charging of the battery 210 (FIG. 2) of the vehicle 100 or to provide AC charging from the battery 210 of the vehicle 100. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
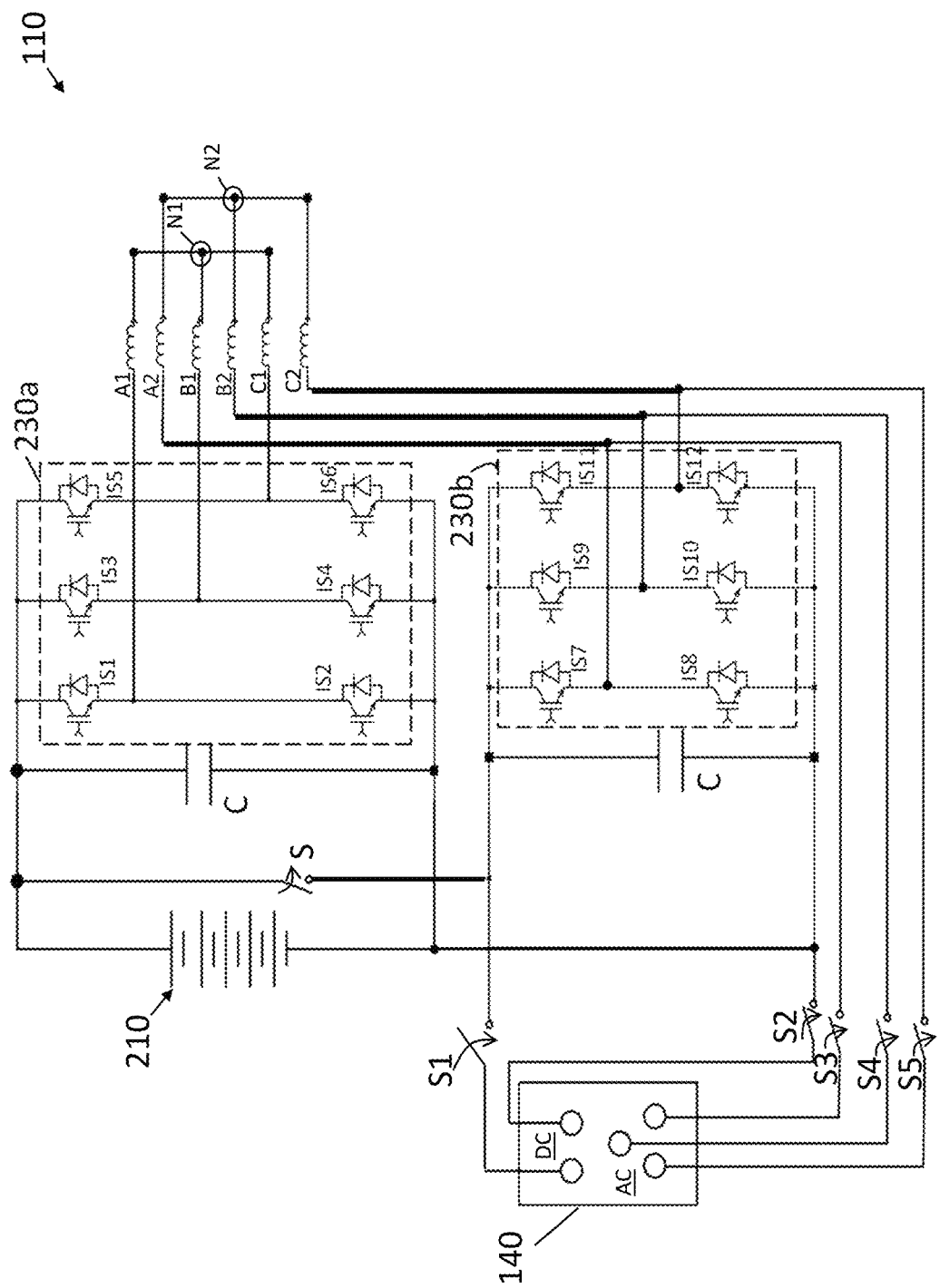
FIG. 2 is a schematic diagram of a high density universal charging system for use in a vehicle according to one or more embodiments.

FIG. 2 is a schematic diagram of a high density universal charging system 110 for use in a vehicle 100 according to one or more embodiments. The high density universal charging system 110 includes the battery 210 that may be charged with a universal charger 140 that includes both DC and AC charging ports, as indicated, and facilitates AC or DC charging. While the AC charging port is shown with three lines, the AC charging is not limited to three-phases and may, instead, use any two phases based on the control of switches S3, S4, and S5 during AC charging, which is further discussed. Optional switches S1 through S5 may be controlled to connect the AC or DC charging port of the universal charger 140 to the battery 210.

Two sets of windings A1, B1, C1 and A2, B2, C2 are shown respectively coupled to two inverters 230a, 230b (generally referred to as 230) that are electrically separated. Separate inverters 230a, 230b each require a power module and driver (i.e., control board to signal the switches IS1 through IS6 or IS7 through IS12). The capacitor C shown in parallel with each of the inverters 230 may be the same capacitor C or two different ones. The inverters 230 sharing the capacitor C, according to an exemplary embodiment, may reduce the capacitor size (e.g., by 30 percent) by using ripple cancellation control. As a result, the drive system power density may be increased. The inverters 230 may be integrated into a split-phase converter, as detailed with reference to FIG. 3.

The two sets of windings A1, B1, C1 and A2, B2, C2 are electrically isolated from each other and each has its own neutral connection point N1 or N2. As discussed with reference to the different scenarios, the two sets of windings A1, B1, C1 and A2, B2, C2 may function as an isolated transformer. That is, the pairs of windings A1-A2, B1-B2, and C1-C2 act as transformers. The two sets of windings A1, B1, C1 and A2, B2, C2 share a stator core and rotor (not shown) of a machine. The machine may be a synchronous, permanent magnet, inductance, or other type of electric machine, but a wound-field synchronous machine or synchronous reluctance machine may be advantageous. Based on the torque requirements, the number of turns made in each of the two sets of windings A1, B1, C1 and A2, B2, C2 may be the same or may be different.

All of the switches S and S1 through S5 are shown in the open position in FIG. 2, but, as indicated by the arrows, each of the switches S and S1 through S5 may be closed. The switches IS1 through IS12 of the inverters 230 are shown as insulated gate bipolar transistors (IGBTs) and may be on (i.e., connected) or off (i.e., disconnected). The switches S, S1 through S5, and IS1 through IS12 may all be controlled by the controller 120 based on the controller 120 determining a mode of operation (e.g., powering the AC grid 130, charging of the battery 210 using AC or DC via the universal charger 140, powering the vehicle 100 as a propulsion drive).

The switch S is closed during drive mode (i.e., when the battery 210 is powering the vehicle 100), which may be the default mode according to exemplary embodiments. As the schematic diagram of FIG. 2 shows, both inverters 230a, 230b are used when the switch S is closed. When the switch S is open, each inverter 230 and corresponding winding set (i.e., inverter 230a and winding set A1, B1 and C1, inverter 230b and winding set A2, B2, and C2) may also be used independently as a drive based on the torque and efficiency requirements. Each of the scenarios that is facilitated by the high density universal charging system 110 and the corresponding positions of the switches S and S1 through S5 are detailed.

When the high density universal charging system 110 is used for AC charging or to facilitate supply of the AC grid 130 from the battery, the switch S is open, along with switches S1 and S2. Switches S3, S4, and S5 are closed for three-phase charging but any two of the switches S3, S4, and S5 may be open for single phase charging. In the AC charging scenario, the two sets of windings A1, B1, C1 and A2, B2, C2 function as an isolated transformer and the inverter 230a is used as a synchronous active pulse width modulation (PWM) rectifier to convert AC (from the universal charger 140) to DC (needed by the battery 210), as well as to control the power. Further, the switches IS1 to IS6 are also used to perform power factor correction, which reduces harmonic distortion is the AC supplied by the universal charger 140 (i.e., shapes the line current to create a current waveform close to a fundamental sine wave and aligns the phase with the voltage from the AC grid 130).

When the high density universal charging system 110 is used for DC charging of the battery 210, the switches S1 and S2 are closed and the switches S3, S4, and S5 are open. However, the switch S may be open or closed based on the voltage of the battery 210 and the DC port of the universal charger 140. When the voltage of the battery 210 (e.g., 400 volts (V)) is the same as that of the universal charger 140, then the switches S, 51, and S2 are closed. Based on those switch positions, the universal charger 140, and more specifically, a DC fast charging station directly connects to terminals of the battery 210 and charges the battery 210 in the way a DC fast charging station normally would charge the battery 210.

However, when the voltage of the battery 210 is not the same as that of the universal charger 140, then the switch S is open, the two sets of windings A1, B1, C1 and A2, B2, C2 function as an isolated transformer and both inverters 230a, 230b are used as a dual active bridge DC-DC converter to control the power in either direction. For example, the lower voltage of the universal charger 140 may be boosted to the higher voltage needed or the higher voltage of the universal charger 140 may be bucked to the lower voltage needed by the battery 210 based on controlling the switches IS1 through IS12 of the inverters 230.

Figure 3B:
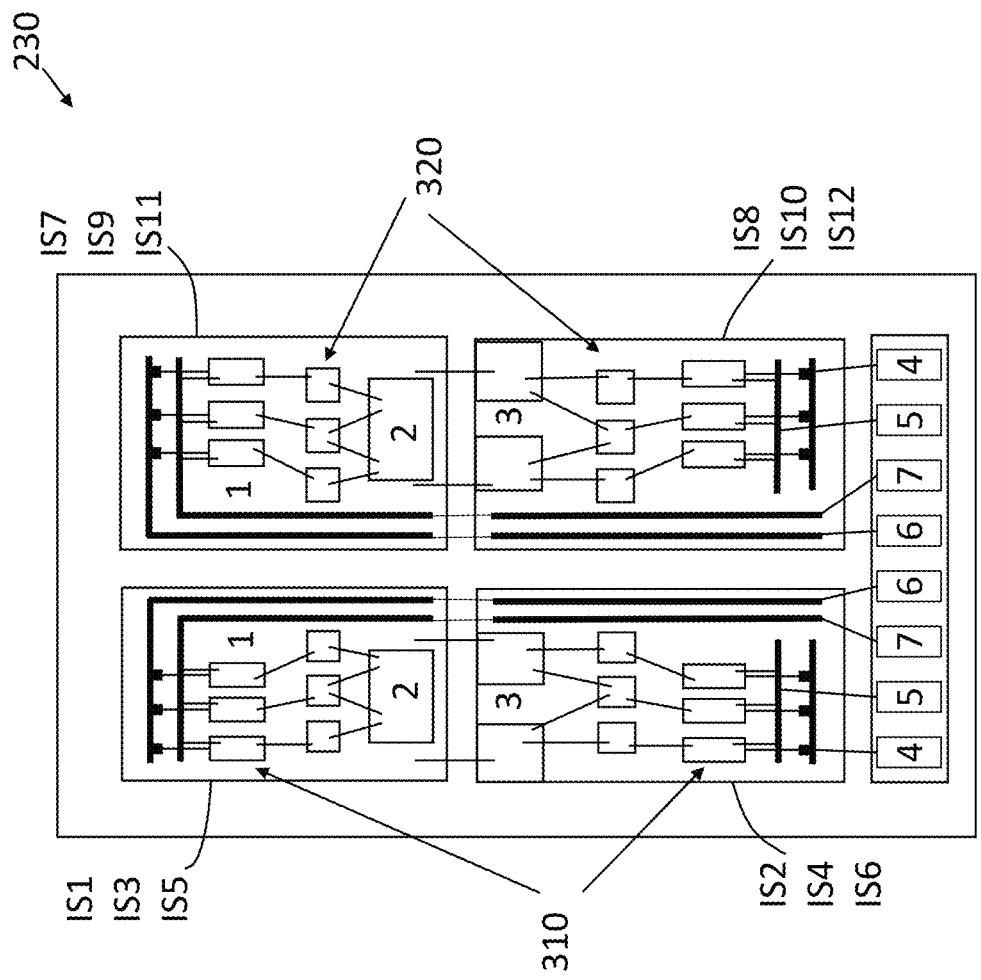
FIG. 3B is a block diagram illustrating aspects of the inverters of the high density universal charging system according to one or more embodiments.
Figure 3A:
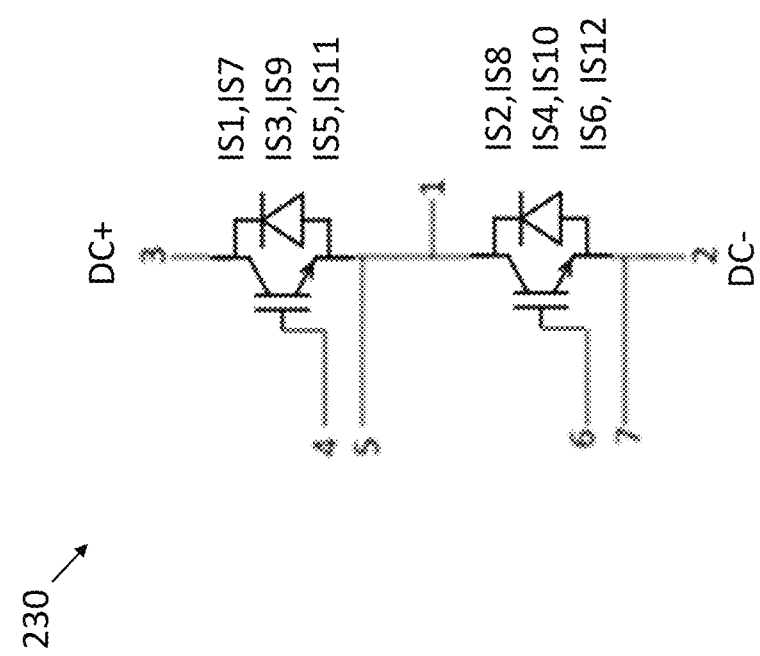
FIG. 3A is a circuit diagram of aspects of the inverters of the high density universal charging system according to one or more embodiments.

FIG. 3A is a circuit diagram of aspects of the inverters 230 of the high density universal charging system 110 according to one or more embodiments. The circuit diagram shows a common point 1, the AC terminal, between two switches that are implemented as IGBTs between point 2, the negative DC terminal, and point 3, the positive DC terminal. As indicated, according to the arrangement shown in FIG. 2, the two switches may be IS1 and IS2, IS3 and IS4, or IS5 and IS6, for example. Control signals 4, 5, 6, and 7 are from the driver. The controller 120 may control the driver, which in turn controls the switches IS1 through IS12 of the inverters 230.

FIG. 3B is a block diagram illustrating aspects of the split-phase dual inverter arrangement that allows the inverters 230a, 230b to share a capacitor C. The inverters 230a, 230b are integrated. Specifically, two switches from each inverter 230a, 230b are fabricated as four submodules within one module, as shown. Each of the switches IS1 through IS12 may include a plurality of semiconductor die using silicon carbide (SiC) metal-oxide-semiconductor field-effect transistors (MOSFETs) 310 or IGBTs, indicated by rectangles, and SiC junction barrier Schottky (JBS) or ultrafast Si diodes 320, indicated by squares. All of the MOSFETs 310 and JBS diodes 320 are not labelled for readability. As shown, the four submodules for a given module may be IS1-IS7 and IS2-IS8, IS3-IS9 and IS4-IS10, or IS5-IS11 and IS6-IS12. In some cases, with suitable SiC MOSFETs, the JBS diode die may be omitted.

This arrangement reduces the current ripple requirement for the capacitor C of the inverter 230. The current allocation among the inverters 230a, 230b is based on the rated current for each of the sets of windings A1, B1, C1 and A2, B2, C2. As indicated by FIG. 2, the sets of windings A1, B1, C1 connects to the submodules shown on the left side of FIG. 3B and the set of windings A2, B2, C2 connects to the submodules shown on the right side of FIG. 3B. The total die area of each module is unchanged in comparison to using a single inverter with combined windings. The two submodules on the left side of each module can be separated from the two submodules on the right side to form two independent modules from each module that is formed as shown in FIG. 3B. This separation would require additional drivers and current sensors.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A system in a vehicle comprising:
a first set of two or more windings, wherein each winding in the first set of two or more windings is connected to each other winding in the first set of two or more windings at a first neutral connection point;
a second set of two one or more windings electrically isolated from the first set of one or more windings, wherein each winding in the second set of two or more windings is connected to each other winding in the second set of two or more windings at a second neutral connection point;
each winding in the first set of two or more windings being electromagnetically paired with one winding in the second set of two or more windings and each winding in the second set of two or more windings being electromagnetically paired with one winding in the first set of two or more windings such that each pair acts as a transformer;
a first inverter coupled to a battery of the vehicle and the first set of one or more windings;
a second inverter electrically separated from the first inverter and coupled to the second set of one or more windings;
a universal charger including an alternative current (AC) charging port and a direct current (DC) charging port, wherein the universal charger is connected to a DC input of the first inverter and a DC input of the second inverter via a second switch, and the universal charger is connected to a DC return of the first inverter and a DC return of the second inverter via a third switch, and wherein the universal charger is connected to the second set of one or more windings via a set of fourth switches; and a first switch configured to be controlled to close to connect the second inverter to the battery.

2. The system according to claim 1, wherein the first switch is controlled to be open during charging of the battery via the AC charging port of the universal charger and the second inverter is not used.

3. The system according to claim 1, wherein the first inverter functions as a synchronous active rectifier configured to convert AC from the AC charging port to DC needed by the battery and the first inverter is configured to perform AC to DC conversion, power control, and power factor correction.

4. The system according to claim 1, wherein the first switch is controlled to be closed during charging of the battery via the DC charging port of the universal charger based on a voltage of the DC charging port and the battery being a same voltage.

5. The system according to claim 1, wherein the first switch is controlled to be open during charging of the battery via the DC charging port of the universal charger based on a voltage of the DC charging port and the battery being different voltages.

6. The system according to claim 5, wherein the first set of two or more windings and the second set of two or more windings function as a transformer.

7. The system according to claim 6, wherein the first inverter and the second inverter are a dual active bridge DC-DC converter.

8. The system according to claim 1, wherein the first inverter and the second inverter are integrated inverters such that a pair of internal inverter switches of the first inverter and a pair of internal inverter switches of the second inverter are fabricated as four submodules of a module that share a capacitor.

9. The system according to claim 8, wherein a current allocation among the four submodules is based on a current rating of the first set of two or more windings and the second set of two or more windings.

10. The system of claim 1, wherein the first set of two or more windings contains exactly three windings, and wherein the second set of two or more windings contains exactly three windings.

11. A method of assembling a system in a vehicle, the method comprising:

arranging a first set of two or more windings, wherein each winding in the first set of two or more windings is connected to each other winding in the first set of two or more windings at a first neutral connection point;

arranging a second set of two or more windings to be electrically isolated from the first set of two or more windings, wherein each winding in the second set of two or more windings is connected to each other winding in the second set of two or more windings at a second neutral connection point;

each winding in the first set of two or more windings being electromagnetically paired with one winding in the second set of two or more windings and each winding in the second set of two or more windings being electromagnetically paired with one winding in the first set of two or more windings such that each pair acts as a transformer;

coupling a first inverter to a battery of the vehicle and the first set of two or more windings;

arranging a second inverter to be electrically separated from the first inverter and coupling the second inverter to the second set of two or more windings;

arranging a universal charger including an alternative current (AC) charging port and a direct current (DC) charging port, wherein the universal charger is connected to a DC input of the first inverter and a DC input of the second inverter via a second switch, and the universal charger is connected to a DC return of the first inverter and a DC return of the second inverter via a third switch, and wherein the universal charger is connected to the second set of one or more windings via a set of fourth switches; and configuring a switch to be controlled to close to connect the second inverter to the battery.

12. The method according to claim 11, wherein the configuring the switch includes controlling the switch to be open during charging of the battery via the AC charging port of the universal charger such that the second inverter is not used.

13. The method according to claim 11, further comprising configuring the first inverter to function as a synchronous active rectifier to convert AC from the AC charging port to DC needed by the battery and configuring switches of the first inverter to perform AC to DC conversion, power control, and power factor correction.

14. The method according to claim 11, wherein the configuring the switch includes controlling the switch to be closed during charging of the battery via the DC charging port of the universal charger based on a voltage of the DC charging port and the battery being a same voltage.

15. The method according to claim 11, wherein the configuring the switch includes controlling the switch to be open during charging of the battery via the DC charging port of the universal charger based on a voltage of the DC charging port and the battery being different voltages.

16. The method according to claim 15, wherein the arranging the first set of two or more windings and the second set of two or more windings includes arranging the first set of two or more windings and the second set of two or more windings to function as a transformer.

17. The method according to claim 16, further comprising configuring the first inverter and the second inverter to function as a dual active bridge DC-DC converter.

18. The method according to claim 11, further comprising configuring the first inverter and the second inverter to be integrated inverters such that a pair of switches of the first inverter and a pair of switches of the second inverter are fabricated as four submodules of a module and coupling the first inverter and the second inverter to a shared capacitor.

19. The method according to claim 18, further comprising allocating current among the four submodules based on a current rating of the first set of two or more windings and the second set of two or more windings.

20. The method of claim 11, wherein the first set of two or more windings contains exactly three windings, and wherein the second set of two or more windings contains exactly three windings.

* * * * *